(12) United States Patent
Drouin

(10) Patent No.: US 10,579,220 B2
(45) Date of Patent: Mar. 3, 2020

(54) METHOD AND SYSTEM FOR STORY DEVELOPMENT WITH A DYNAMIC GRID

(71) Applicant: Unity IPR ApS, Copenhagen K (DK)

(72) Inventor: Sylvio Herve Drouin, San Francisco, CA (US)

(73) Assignee: Unity IPR ApS, Copenhagen K (DK)

( * ) Notice: Subject to any disclaimer, the term of this patent is extended or adjusted under 35 U.S.C. 154(b) by 346 days.

(21) Appl. No.: 15/336,445

(22) Filed: Oct. 27, 2016

(65) Prior Publication Data

US 2017/0115837 A1 Apr. 27, 2017

Related U.S. Application Data

(60) Provisional application No. 62/247,041, filed on Oct. 27, 2015.

(51) Int. Cl.
*G06F 3/048* (2013.01)
*G06F 3/0482* (2013.01)
*H04N 21/854* (2011.01)
*G11B 27/34* (2006.01)
*G11B 27/031* (2006.01)
*H04N 21/482* (2011.01)

(52) U.S. Cl.
CPC .......... *G06F 3/0482* (2013.01); *G11B 27/031* (2013.01); *G11B 27/34* (2013.01); *H04N 21/854* (2013.01); *H04N 21/4821* (2013.01)

(58) Field of Classification Search
CPC ........................................................ G06F 3/048
See application file for complete search history.

(56) References Cited

U.S. PATENT DOCUMENTS

| | | | |
|---|---|---|---|
| 2006/0214953 A1* | 9/2006 | Crew | G06T 3/40 345/660 |
| 2007/0220583 A1* | 9/2007 | Bailey | G11B 27/034 725/135 |
| 2010/0074590 A1* | 3/2010 | Momosaki | G11B 27/034 386/278 |
| 2013/0232419 A1* | 9/2013 | Yates | G06F 3/0484 715/723 |

\* cited by examiner

*Primary Examiner* — Pei Yong Weng
(74) *Attorney, Agent, or Firm* — Schwegman Lundberg & Woessner, P.A.

(57) ABSTRACT

A system includes a display device, one or more hardware processors, and a story development engine executable by the one or more hardware processors. The story development engine is configured to perform operations comprising generating a story grid, the story grid including one or more columns, each column of the one or more columns representing one part in a digital story, displaying the story grid to a user via the display device, receiving a first content element, creating a first cell within a first column, associating the first cell with the first content element, and marking the first cell as a selected cell from a plurality of cells within the first column, the selected cell being identified for inclusion as the one part of the digital story and excluding the other cells of the plurality of cells from the digital story.

20 Claims, 14 Drawing Sheets

US 10,579,220 B2

METHOD AND SYSTEM FOR STORY DEVELOPMENT WITH A DYNAMIC GRID

RELATED APPLICATIONS

This application claims the benefit of priority to U.S. Provisional Patent Application Ser. No. 62/247,041, filed Oct. 27, 2015, herein incorporated by reference in its entirety.

TECHNICAL FIELD

The present disclosure relates to the field of multimedia content development and, more specifically, to software tools for use in creating and editing multimedia stories.

BACKGROUND

Various tools exist to allow artists to create stories. These tools range from text editors that can be used to write a story to specialized software for creating detailed, high quality multimedia projects ready for consumption by an audience. What is missing from this landscape is a tool to help assemble the high level elements (e.g., major story plot elements) of a story without having to make decisions on the final structures and fine details (e.g., minor scene visual details) of every one of those story elements. What is also missing is a tool that would allow inexperienced story creators to brainstorm, pre-produce and prepare material in a high level context (e.g., in a very rough movie format) where only a potential story direction is available, absent a fully detailed story.

BRIEF DESCRIPTION OF THE DRAWINGS

Various ones of the appended drawings merely illustrate example embodiments of the present disclosure and cannot be considered as limiting its scope, and in which.

It will be noted that throughout the appended drawings, like features are identified by like reference numerals.

Figure 1:
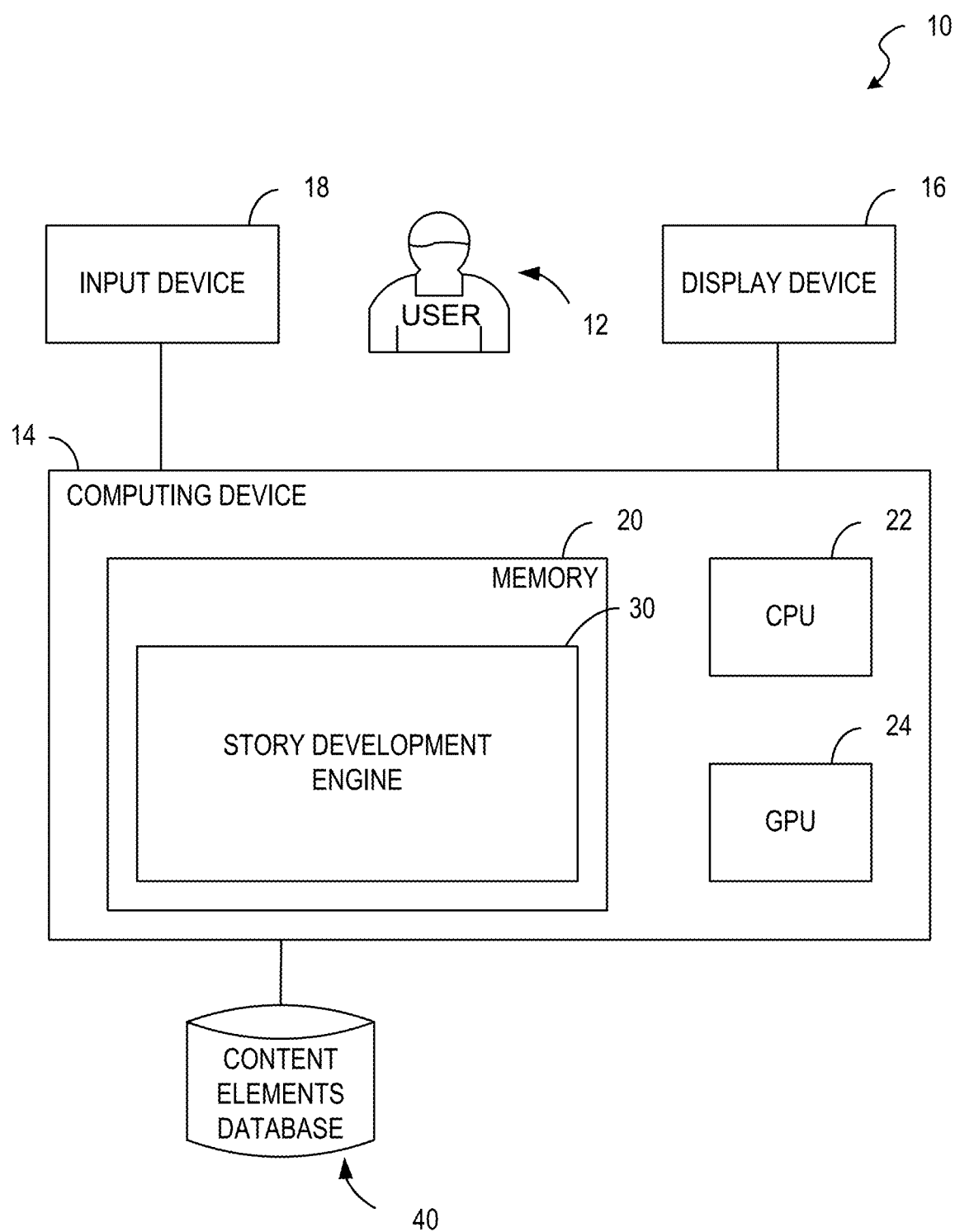
FIG. 1 is a flow chart illustrating a method for creating a story grid, in accordance with one embodiment.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

The systems and methods described herein provide tools for creating stories. In an example embodiment, a story development system allows a user (e.g., a story developer) to assemble various types of media elements within cells of a storyboarding tool, or "story grid." The story development system includes a story development engine configured to present the story grid to the user (e.g., via a display device) and allow the user to interact with the story grid to create or edit the story. The columns of the story grid represent a sequential time evolution in the horizontal direction (e.g., from left to right, or from right to left). The cells within each column (e.g., the rows of a given column) represent various different media element possibilities for each column. The story development engine presents a story creation mode which allows the user to create or edit a story by selecting media elements for the various cells in the story grid. The content elements may include digital content such as audio, video, notes/text, images, web uniform resource locators (URLs), computer code including HyperText Markup Language (HTML)/Cascading Style Sheets (CSS), JavaScript (JS), and other such digital media. The story development engine also provides a playback mode in which selected content elements within the story grid are displayed sequentially according to the horizontal order of the columns. As such, several stories can be created, edited, and played back from the story grid by selecting different cells (e.g., containing different content elements) for each column.

More specifically, in one example embodiment, the story development engine provides a graphical user interface for creating and displaying a dynamic story grid. The graphical user interface includes a first display area containing a grid of cells organized into columns and rows, where each cell may contain a content element. The set of columns represents a sequential order of slots, and the set of rows represents various content element options for each of the slots (e.g., for each of the columns). The grid can be manipulated through the user interface using an input device (e.g., a mouse or a touch screen device), allowing the user to rearrange the grid and the selection of grid elements during the story creation process. Columns may be moved horizontally relative to the other columns, allowing the user to change the sequential order of the columns. The story grid allows content elements to be assembled together at a high level (e.g., to form the core of a potential story) without necessarily needing the details of the story structure or story parameters, or special effects, or scripts. The user arranges and rearranges the content elements within the story grid, thus creating various potential story structures. Once a final story structure is assembled, the story development engine can output the story into a media output such as, for example, a movie or digital video, a presentation, a 2-dimensional (2D) or 3-dimensional (3D) game, an interactive web experience, or any other form of passive or interactive storytelling experience. In some embodiments, the story grid and associated data is stored, and may be read by another tool that generates the polished media output.

In some embodiments, the grid may be configured with multiple story sections, where each story section corresponds with a particular part of a story. Each story section includes a dynamic number of columns that may be adjusted by the user during story development (e.g., to add or remove additional slots within the story). Each story section may be separately labelled to allow easy identification of the story section for the user. The label on a story section may also allow a user to target the section for a process (e.g., to remotely add elements to the cells of a section over a network).

In some embodiments, the story development system may be used to perform aspects of pre-production on a story, using the story grid of content elements as a way to render a draft of a story from those content elements. The content elements, as arranged within the story grid, form the outline of one or more stories. The content elements may be polished content elements (e.g., high definition video clips with high quality rendered graphics), or they may also be rough media elements (e.g., cell phone video or picture, digital scan of a hand drawn imate) that may be refined by specialized multimedia software prior to packaging into a produced experience. The pre-production process within the story development system can be done by a single creator using a content database (e.g., a single individual using multimedia from their local storage) or the pre-production can be done collaboratively over a network (e.g., by multiple individuals using various computing devices and a shared content database).

The term "story" or "digital story", as used herein, refers to digital content that includes multiple parts which, when combined together in an ordered sequence (e.g., by a story developer), serve to present a narrative for the viewer. Stories should be understood to include all forms of multimedia representations of stories and interactive experiences including but not limited to short or full-length films, animated films, video games, presentations, commercials, music videos, television programs (e.g., news, entertainment), and the like. As used herein, the term "part" or "story part" refers to one segment of a story associated with one content element (e.g., a single 10 second video or audio file). The term "section" refers to a part of a story that may include multiple parts (e.g., multiple content elements).

FIG. 1 is a component diagram of an example story development system 10 with which a user 12 may develop a story. In the example embodiment, the story development system 10 includes a computing device 14 (e.g., a personal computer, a mobile computing device, and so forth) having a display device 16 and one or more input devices 18. The computing device 14 includes a memory 20, one or more central processing units (CPUs) 22, and one or more graphics processing units (GPUs) 24. The computing device 14 also includes a story development engine 30, executed by the CPU 22 or GPU 24, that provides a story development environment to the user 12. The story development engine 30 include computer-executable instructions residing in the memory 20 that are executed by the CPU 22 or the GPU 24. The story development system 10 also includes a content elements database 40 which includes a pool of content elements which may be used during story creation.

During operation, the story development engine 30 provides a story grid to the user 12 within the story development environment (not depicted in FIG. 1), along with various associated functionality as described herein. The user 12 uses the story grid to manipulate the contents of a story, such as by adding content elements from the content elements database 40 into the story grid. Once the user 12 is satisfied with the story, the story development engine 30 generates an output media file that may be played by conventional media players.

In some embodiments, the story development system 10 and the various associated hardware and software components described herein may provide the story development environment as 2D or 3D content via a conventional 2D display (e.g., a flat screen display). In other embodiments, the story development system 10 may provide the story development environment within a virtual reality (VR) or augmented reality (AR) environment.

Figure 2:
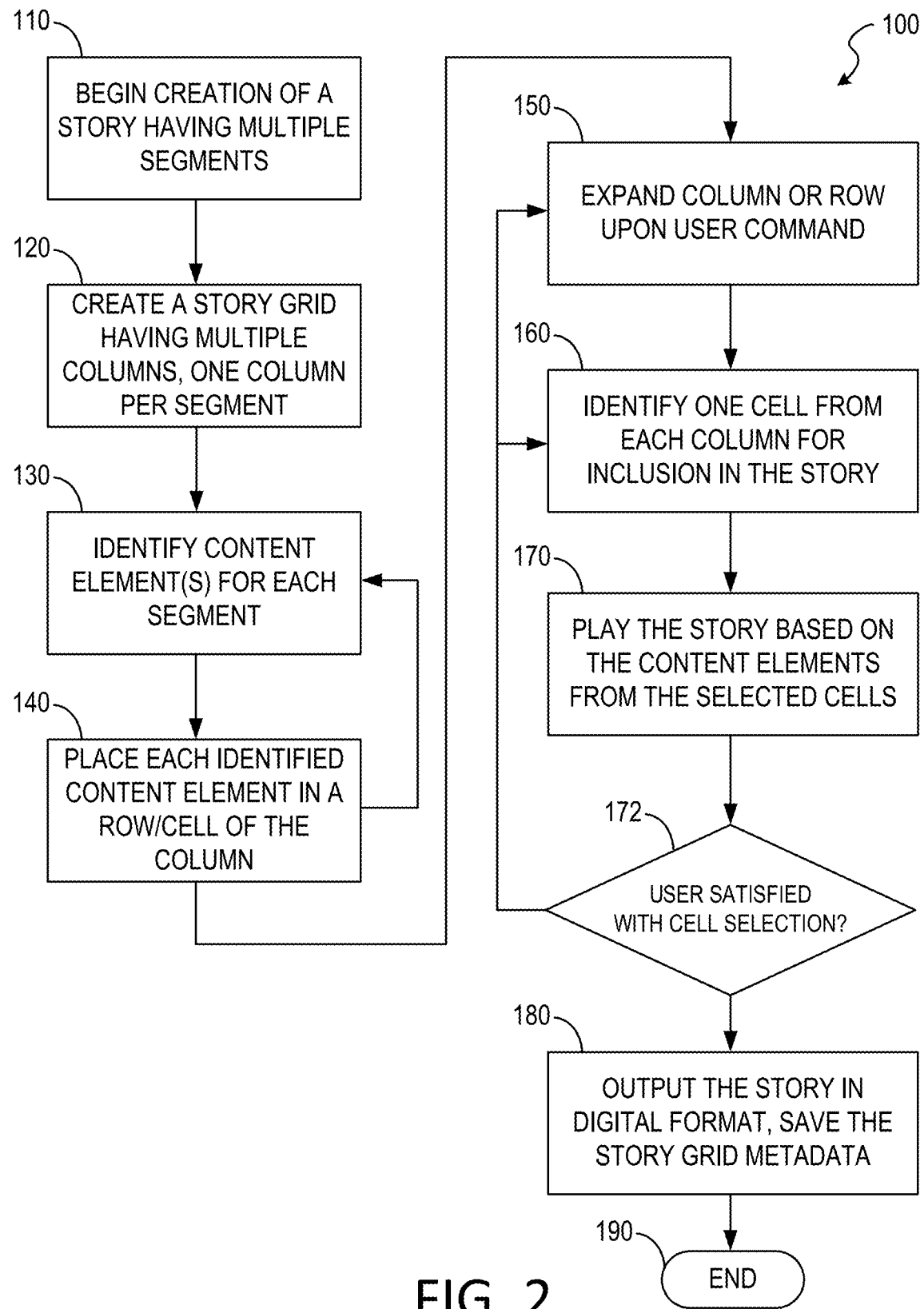
FIG. 2 is a schematic illustrating a story grid, in accordance with one embodiment.

FIG. 2 is a flowchart illustrating an example method 100 for creating or editing a digital story using a story grid. In the example embodiment, a story developer, such as the user 12, begins with a conceptual idea for a story, and may break the story into multiple parts, or "story parts". For example, the user 12 may be making a car commercial, and may envision breaking the commercial into three story parts. The user 12 may envision the first part to be an introduction part, perhaps showing appealing imagery of the car, or branding for the manufacturer. The second part may be about features of the car, such as performance characteristics of the car, luxury characteristics of the brand, and so forth. The third part may be a sales pitch, perhaps highlighting price point of the model, or manufacturer or dealer incentives. The user 12 may then construct variations of that story using the story grid, leveraging various pre-existing content elements appropriate for each part.

In the example embodiment, the story is created by building up parts within the story grid, and assigning one or more content elements to the parts. More specifically, at operation 110, a story is created that will have multiple parts. The parts can be any logical breakdown of the story such as, for example, a breakdown into acts, or scenes, or shots, or any combination thereof, or any other method of division of the story. At operation 120, the story development engine 30 creates an initial story grid with at least one column in the grid for each story part. In some embodiments, the story grid start with a default number of columns, such as between one and five columns. Initially, each column may have zero rows, or a default number of empty rows. As the user 12 builds the story, they will add columns and rows to the grid to build out the story. If loading a pre-existing grid-based story (e.g., a story previously developed with the story development engine 30 and having story grid metadata already defined), the story development engine 30 creates a column for each part of the story.

In the example embodiment, at operation 130, the user selects one or more content elements for each part of the story (e.g., for each column in the story grid). If no content element is identified for a column, then that column is left empty. Initially, the user 12 may add one or more content elements to any of the already-existing columns. The user 12 may select these content elements from the content elements database 40, or may provide one or more content elements to the story development engine 30 (e.g., from a local or networked file system, cloud-based storage, or the like). At operation 140, each of the content element(s) for a particular part are placed in the associated column of the story grid. More specifically, each of the individual media elements is placed in one row (e.g., one cell) of the column. For example, if there are four content elements identified for a particular part, then the storage development engine 30 creates four cells within that part's column, one for each content element. As such, cells are created and filled with media elements for all parts of the story. During loading of a pre-existing story, story grid metadata may identify one or more content elements for each particular story part. In the car commercial example, the user 12 may add multiple introduction videos for a first part, where each video goes into a single cell of the same column (e.g., the first part's column). Similarly, the user 12 may add multiple pictures to the second part's column, each of which may be directed at highlighting features of the car, and the user 12 may add videos of different sales pitches that have been developed for the car to the third part's column. As such, the story development engine 30 creates a cell within the associated column for each identified content element.

In the example embodiment, at operation 150, the user 12 may add new columns or rows to, or delete or hide existing columns or rows from, the story grid to modify the story. New columns and rows may be empty. In the car commercial example, the user 12 may begin with a single default column, and may then add two columns, thereby making one column for each of the three envisioned parts. At operation 160, one cell per column is identified to be the active content element for that part. In some embodiments, the user 12 may select one of the content elements from each column. If no cell is selected for a column, then a default cell for that column is determined by a set of rules. In some embodiments, the first content element added to a column becomes automatically selected when added. In some embodiments, addition of a subsequent content element automatically selects that newly added content element. In some embodiments, if no content element for a column is selected, then the story development engine 30 presumes that the first content element is the selected content element. In other embodiments, if no content element is selected, then the story development engine 30 presumes that the most recently added content element is selected. In still other embodiments, if no content element for a column is selected, then the story development engine 30 presumes that no content element is to be included for that column, effectively "hiding" that part.

In the example embodiment, the story may be played back at any time (see operation 170). During playback, the story development engine 30 assembles and outputs a sequential ordering of the selected content elements, one from each column, and ordered based on the order of the columns. The sequential ordering follows the order of the columns from left to right in the story grid. The format of the output of the player module can include any known multimedia format and any new multimedia format created specifically for a scratchpad. The output format can have a mixture of movie clips, images and any other media format.

In some embodiments, the story development engine 30 may provide a previewing feature for a subset of the story. For example, the user 12 may select a subset of columns, or a subset of cells, and initiate a preview of the selected content. In response, the story development engine 30 may display the selected content elements based on the selection of the user 12, thereby allowing the user 12 to preview how the selected content elements would come together if arranged as selected for the final story. The story development engine 30 may present the various selected content elements using known media players based on the media type(s) of the selected content elements.

If, at test 172, the story is unsatisfactory, then the user 12 may modify the story by adding or deleting columns and rows (see operation 150), or by selecting different cells in one or more columns of the story grid to create a different version of the story (see operation 160). If, at test 172, the user 12 is satisfied with the story, or wishes to save the story for later use, the story development engine 30 may output the story in a viewable format (e.g., generate a playable video or other type of media file), or may save the story grid and associated data (e.g., from which the story development engine 30 may re-create the story grid).

Figure 3:
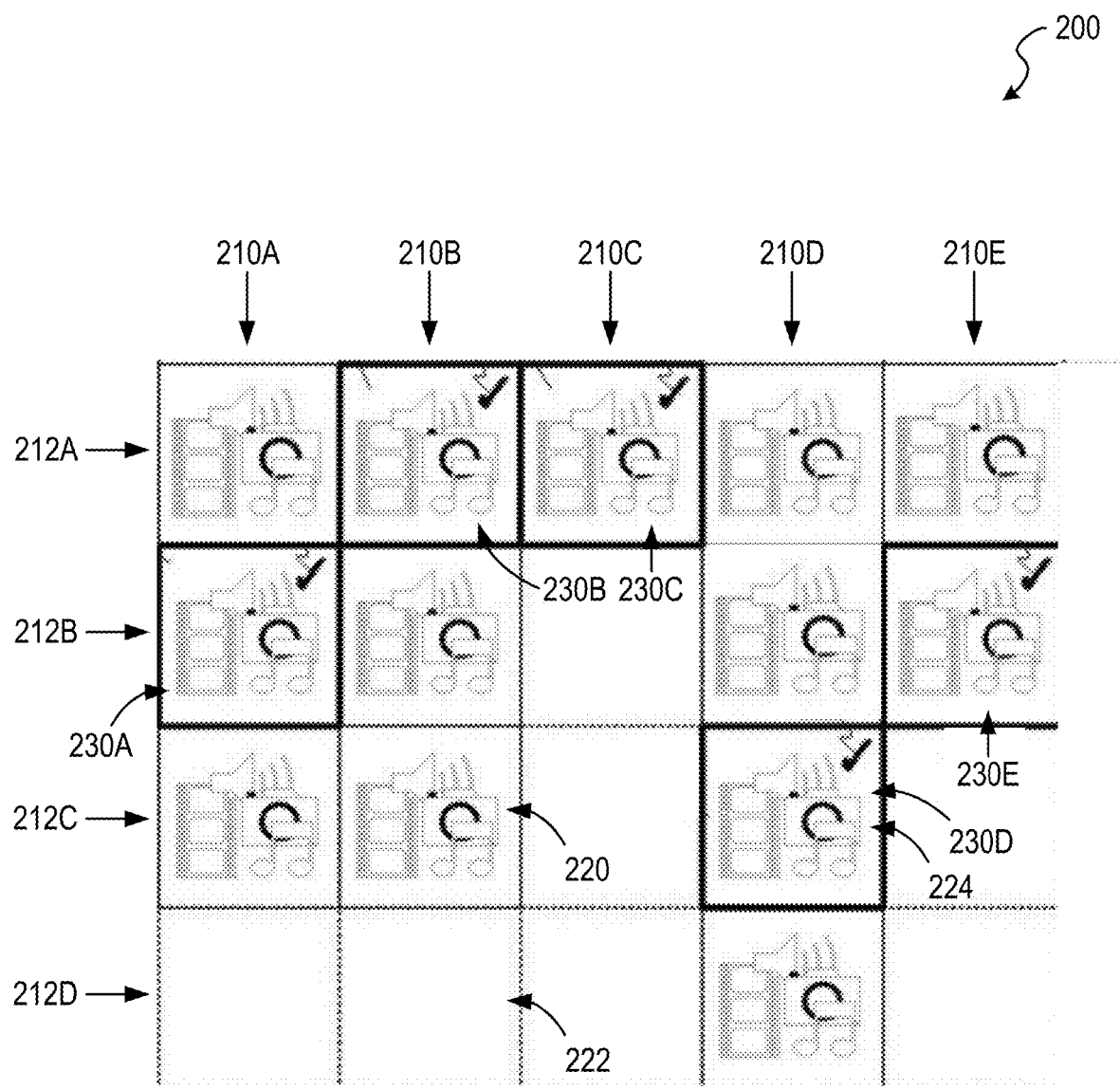
FIG. 3 is a schematic illustrating a story grid, in accordance with one embodiment.

FIG. 3 illustrates an example story grid 200 created by the user 12 using the story development engine 30. The story grid 200 may be displayed to the user 12 via graphical user interface (GUI) on the display device 16, allowing the user 12 to both view and interact with the story grid 200. In the example embodiment, the story grid 200 is a 2D grid having columns 210A, 210B, 210C, 210D, 210E (collectively, "columns 210") and rows 212A, 212B, 212C, 212D (collectively, "rows 212").

In the example embodiment, each intersection of a column and a row defines a cell. For example, at the intersection of column 210B and row 212C is an example cell 220. Within each cell, a content element may or may not be identified. The presence of a content element within a cell is represented in FIG. 3 with a multimedia icon (e.g., a graphic including a film clip icon, audio icon, picture icon, and music note icon), where cells that to not contain a content element appear blank. The example cell 220 has a content element assigned to that cell 220, as indicated by the multimedia icon, and another example cell 222 does has no assigned content element, and thus appears blank. While only five columns and four rows are shown in the example story grid 200 for purposes of illustration, it should be understood that any number of columns and rows are possible. Further, as described herein, the user 12 or the story development engine 30 may add or delete columns or rows from the story grid 200.

In the example embodiment, the story development engine 30 allows one content element (e.g., one cell) to be identified (e.g., selected) for each column 210. Identification of a particular cell within a column 210 indicates that the marked content element will be included in the story in the temporal position represented by the column 210, and similarly, that the other content elements within the column 210 will not be included. Identification of a particular cell within a column 210 is indicated on the story grid 200 by a checkmark in the upper right corner of the cell, as well as highlighted with a thick border. For example, a cell 224 in column 210D (e.g., row 212C) is marked. To mark or unmark a cell, the user 12 may click on the cell with the input device 18. When the user 12 clicks on a cell that is already marked, the story development engine 30 unmarks the cell (e.g., removes the checkmark and highlighting). When the user 12 clicks on a cell that is not already marked, the story development engine 30 marks the cell (e.g., adds the checkmark and highlighting). If another cell in the same column 210 was already marked, the story development engine 30 unmarks the other cell. In some embodiments, a column 210 may have a 'null' cell. As such, the story development engine 30 may bypass that column when playing the story.

There can be multiple possible different stories that can be displayed and created by the story development engine 30 since the number of possible stories is determined by the combination of the possibilities in each row for every column.

In the example shown in FIG. 3, the story includes five columns (e.g., five parts). More specifically, the story includes three possible content elements for the column 210A, three possible content elements for column 210B, one possible content element for column 210C, four possible content elements for column 210D, and two possible content elements for column 210E. The combination of those particular possibilities yields 72 different potential stories that may be created from the content elements shown here (e.g., one from each column 210). In this example, the story currently includes one selected cell from each of the columns 210: the first selected cell 230A is in row 212B of column 210A; the second selected cell 230B is in row 212A of column 210B; the third selected cell 230C is in row 212A of column 210C; the fourth selected cell 230D is in row 212C of column 210D; and the fifth selected cell 230E is in row 212B of column 210E. As such, the example story includes the content elements 230A, 230B, 230C, 230D, and 230E (collectively, "selected elements 230") played sequentially in that order.

Figure 4:
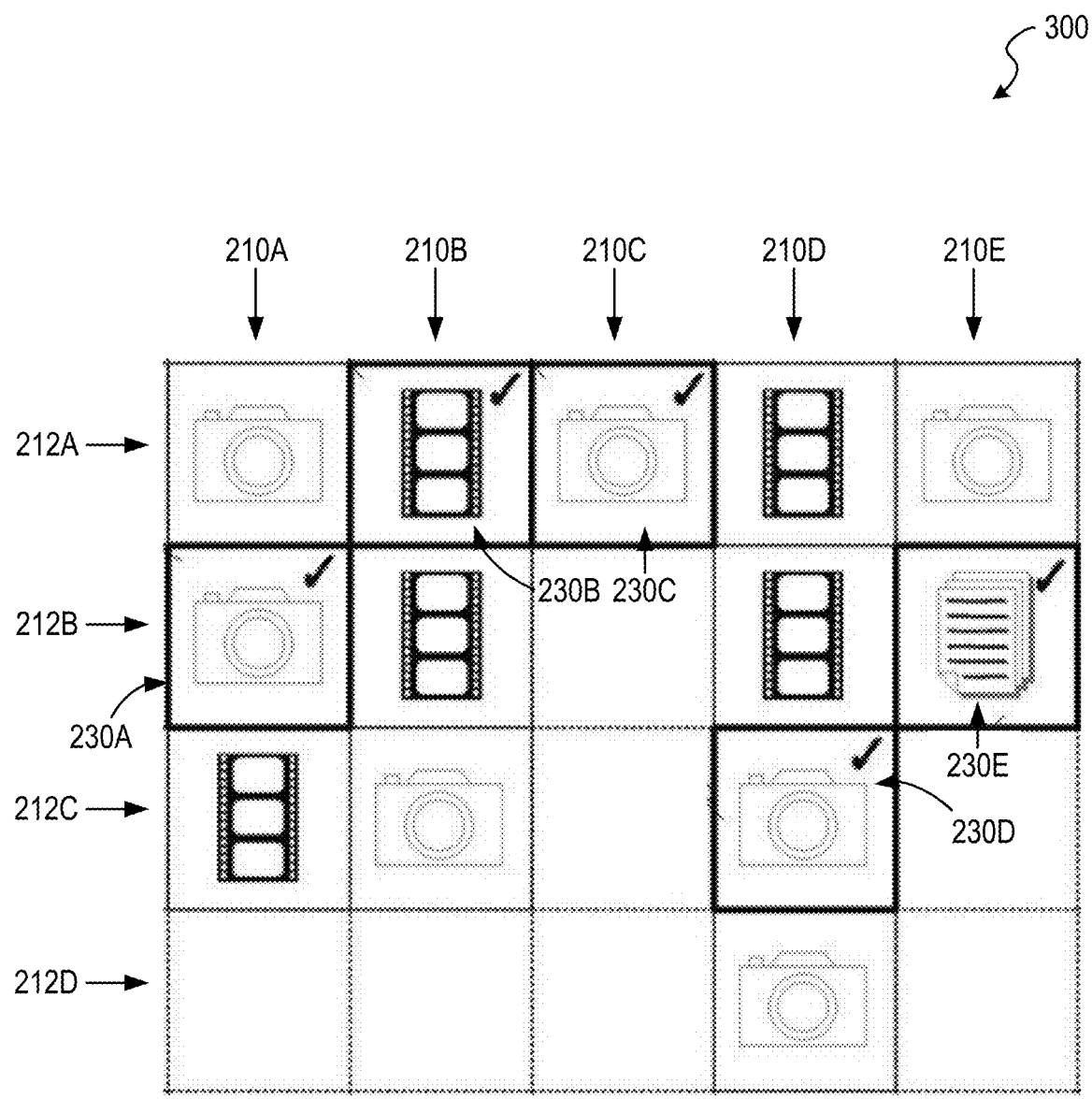
FIG. 4 is a schematic illustrating the creation of a movie clip from a story grid, in accordance with one embodiment.

FIG. 4 illustrates another example embodiment in which cells contain representative images for each specific content element within the cells of a story grid 300 (e.g., based on a media type of the content element associated with the cell). The story grid 300 may be similar to the story grid 200 shown in FIG. 3. Some content elements are digital images, and are represented by a camera icon in FIG. 3 (e.g., cell 230A, 230C, and 230D). Some content elements are digital video, and are represented by a film icon (e.g., cell 230B). Some content elements are text, and are represented by a papers icon (e.g., cell 230E). Each type of content element supported by the story development engine 30 may have its own icon. In some embodiments, content elements may be animation media (e.g., .FBX file) or 3D models.

In some embodiments, the cells may be illustrated with icons representative of the media type, as shown in FIG. 4, and may also include a text title or other metadata about the associated content element. For example, some cells may include a user-defined title for a video clip, a play duration of that clip, a media file format, or other such data. This display indicia for each clip may help the user 12 to remember what each content element is, or may help the user 12 with logistics such as estimating total time, or time consumed by that part. In some embodiments, the cells may include representative images of the associated content element (e.g., in lieu of the icons). For example, instead of the camera icon, the story development engine 30 may instead present a small thumbnail image of the content element. As such, the cell 230A may further help the user 12 remember what that content element contains since they are seeing a small version of the underlying image. Similarly, instead of the film icon, the story development engine 30 may instead present a small thumbnail still image from the underlying video (e.g., the opening frame, or a frame at a pre-determined point within the video).

Figure 5:
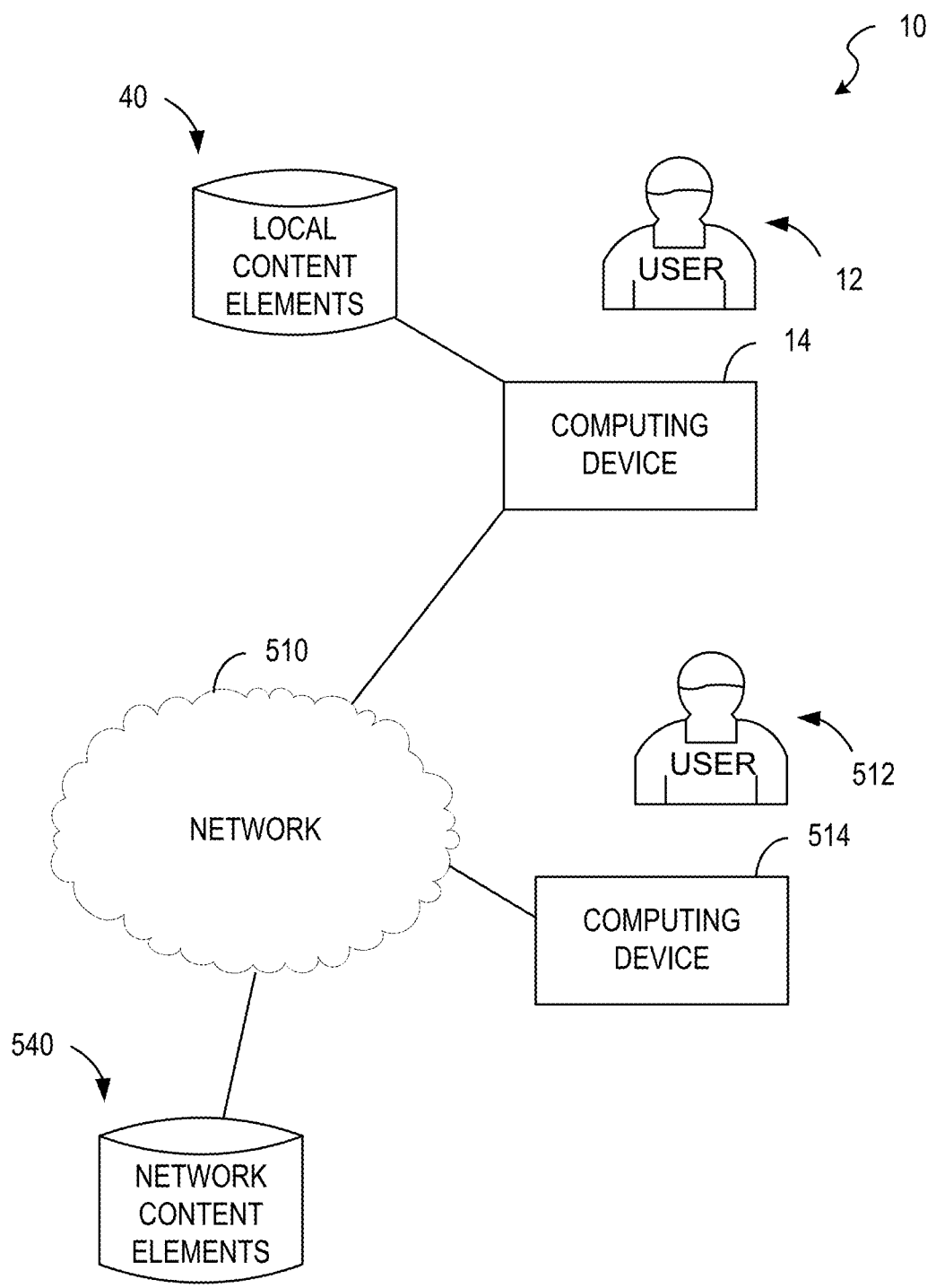
FIG. 5 illustrates an example architecture of the story development system in which users collaborate on a story.

FIG. 5 illustrates an example architecture of the story development system 10 in which users 12, 512 collaborate on a story. In the example embodiment, the user 12 executes the story development engine 30 on their computing device 14 and leverages a local content elements 40 database (e.g., from direct-attached storage). The local content elements 40 database may have content elements gathered or developed by the user 12. The user 512 also executes the story development engine 30 on their computing device 514. Further, the story development system 10 also includes a network content elements 540 database communicatively attached to the computing devices 14, 514 through a network (e.g., the Internet, an enterprise intranet).

In the example embodiment, stories and their associated story grids 200, 300 may be created and edited collaboratively (e.g., by multiple users 12, 512). The collaboration can involve mobile devices, where the GUI for the story grid 200, 300 is conveniently sized and formatted for mobile device displays, and the particular interactions may be easily manipulated via mobile input devices. The mobile aspect of the story scratchpad allows collaborators to create and modify a story and be able to play it back at any time in order to view the progression of the story project. Each of the collaborators may have different levels of access to a story (e.g., view only, full view and edit, section-level, column-level, row-level, and cell-level permissions, add/delete of columns or rows) and, depending on each user's access, they may create and manipulate cells within the story grid 200, 300. The access may be given on a section by section basis with each section of the grid having different access. Collaboration via the story grids 200, 300 allows for simultaneous brainstorming and story creation from multiple users, and possibly from multiple remote locations.

In some embodiments, a collaborative story may include defining sections of a grid (e.g., a grouping of one or more columns). Sections may be labeled and may include a description that summarizes the importance of the section within the outline of the story. Once the sections are defined, one or more of the sections can be assigned to one or more specific collaborators. These collaborators may be given access to the assigned sections and may be able to complete the sections by adding content to the story grid 200, 300, or editing the story grid 200, 300. Some collaborators may have exclusive access to one or more sections. When the story grid 200, 300 is used in a collaborative environment to create a project, the collaborators involved in the project can post content to a particular cell within a section. This posting can occur over a network whereby one or more collaborators sends content from a device (including mobile devices) over the network 510 to a specific grid cell within a section. Each grid cell is labeled such that each cell can be identified and targeted for a content post.

In some embodiments, collaborator(s) may be sent alerts or notifications to entice them to complete the assigned sections. The collaborator(s) may also be given time limits to complete the sections. After a time limit expires, the collaborator(s) may be locked out from adding content to the section. The assigning of sections to different collaborators may be used, for example, to implement "social storytelling" mechanisms applied to the construction of a story by multiple collaborators, where multiple people contribute to a single story and may be allowed to change or add to the story.

In some embodiments, the story development engine 30 may provide alerts associated with the development of the story or the story grid 200. Some example notifications may signal other alert recipients (e.g., other collaborators or stakeholders) on the progress and evolution of a story project. The notifications can include emails, text messages, instant messages, tweets, posts or any other method of notification known to those skilled in the art. The notifications may also inform the alert recipients on any modifications regarding the columns and sections of a story and the media therein (e.g., change details on adds, edits, or deletions made to the story grid 200). In some embodiments, particular changes or content elements within the story grid 200 may be voted on by the collaborators such as to provide a collaborative decision making process. For example, the collaborative aspect described herein can be implemented in a social storytelling application where a group of individuals contribute to a story template by posting elements of their daily life which may then be converted into a movie.

In some embodiments, each section may be labeled (e.g., with a title, short description). Further, each section may contain a dynamic number of columns and a dynamic number of rows. Each of the sections may be correlated with a particular section of the story. When the grid is used in a collaborative environment to create a project, the collaborators involved in the project may post content to a particular cell within these sections. This posting can occur over a network whereby one or more collaborators sends content from a device (including mobile devices) over the network to a specific grid cell within a section. Each grid cell may be labeled such that each cell can be uniquely identified within the story grid 200 and targeted for remote operations, such as posting of content.

Figure 6:
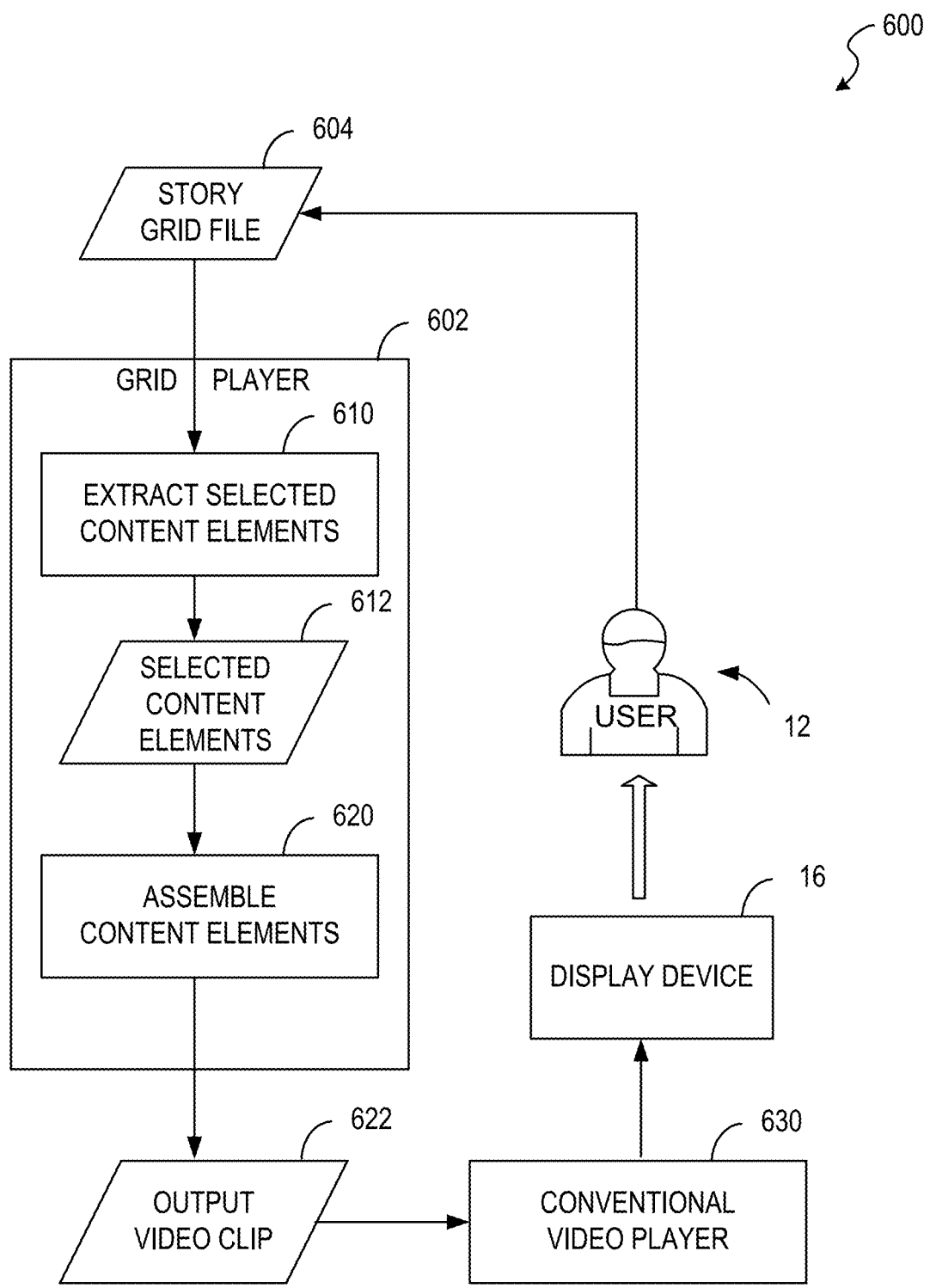
FIG. 6 is a schematic illustrating the rows selected for playback, in accordance with one embodiment.

FIG. 6 is a dataflow diagram illustrating an example method 600 for displaying a story from a story grid file 604. In the example embodiment, the story grid file 604 contains content elements and metadata associated with the story grid 200. A grid player 602 accepts the story grid file 604 as an input and generates a digital video clip 622 as an output. In some embodiments, the grid player 602 may be an integrated component of the story development engine 30. In other embodiments, the grid player 602 may be an independent software component (e.g., a player module installable and executable independent of the story development engine 30).

During operation, in the example embodiment, the story grid file 604 is transmitted to the grid player 602. The story grid file 604 includes media components and other associated metadata defining the story grid 200. For example, the story grid file 604 may include the column and row structure of the story grid 200, each of the content elements configured in each column 210 of the story grid 200, and metadata identifying which content elements are selected in each column 210 of the story grid 200 and an output media type for the story (e.g., audio, video, and so forth). At operation 610, the grid player 602 identifies and extracts the selected content elements 612 within the story grid 200 as provided in the story grid file 604. In this example, the selected content elements 612 include the selected content elements 230.

In the example embodiment, at operation 620, the grid player 602 assembles the selected content elements 612 based on the sequence in which they appear in the story grid 200 (e.g., sequentially, based on column). In the example embodiment, the story grid file 604 designates the story output type to be digital video with audio. As such, the grid player 602 generates an output including the selected content elements 612 serially in sequence 230A, 230B, 230C, 230D, 230E, and as an output video clip 622. The output video clip 622 is constructed in a format that may be played by a conventional video player 630 such as Windows Media Player (WMP). The conventional player 630 presents the output file 622 to the user 12 via the display device 16. In other embodiments, the story grid file 604 may identify other media types for the story grid 200 and, as such, the grid player 602 may construct and output a file for a conventional media player for that media format, and the conventional media player may use other hardware configured to present that type of output to the user 12.

Figure 7:
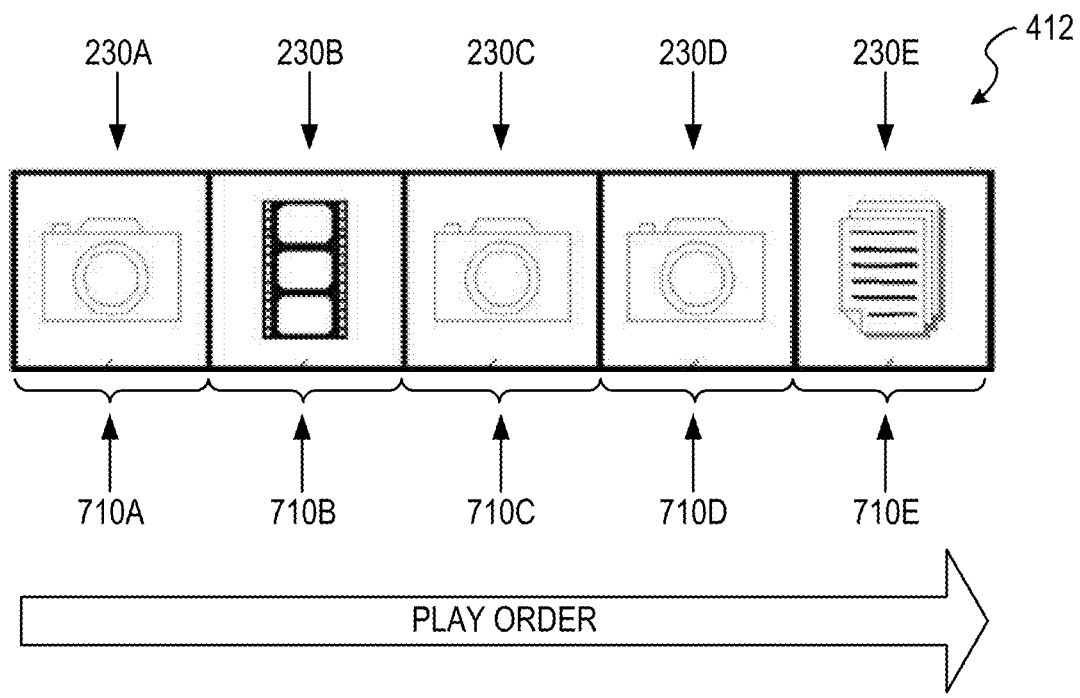
FIG. 7 is a schematic illustrating a story grid, in accordance with one embodiment.

FIG. 7 illustrates the selected content elements 412 prepared by the grid player 402 based on the example story grid 300 shown in FIG. 4. In the example embodiment, the selected content elements 230 are ordered as defined by the story grid file 604 (e.g., as shown by the columns in the story grid 300) and converted by the grid player 402 into the output video clip 422. The selected cell 230A from column 210A occupies a first time slot 710A in the sequential ordering of the content elements 230. The selected cell 230B from column 210B occupies a second time slot 710B. The selected cell 230C from column 210C occupies a third time slot 710C. The selected cell 230D from column 710D occupies a fourth time slot 710D. The selected cell 230E from column 210E occupies a fifth time slot 710E.

In the example embodiment, each cell within the story grid 200, 300 is assigned a duration of time. This time duration is the amount of time the content within the cell is displayed during presentation of the story. The content within a cell can have an intrinsic duration which can be used by the grid player 402 for the cell. For example the content of a cell can be a video clip and the video clip could be 35 seconds long. In such an example, time duration of the cell is determined to be 35 seconds. In some embodiments, the time duration may be less than the default time (e.g., if the user 12 wishes to shorten the video by clipping it). However, some content within a cell may not include time such as, for example, content that includes but is not limited to images and text.

In some embodiments, the grid player 402 assigns a default time duration to non-timed elements. For example, if a cell contains a text note, the grid player 402 may determine a duration for displaying the text. These durations might be defined based on pre-determined defaults, or from metadata associated with the content element 230, or may be determined dynamically for each cell based on the type of content within that cell. For example, a cell containing text may have a duration based on the amount of text to display. Each cell may have a different time duration, which may be independent of its position within the grid. Further, each cell within a column can have a different time duration associated with it. As such, the total duration for the playback of the output is variable and is dependent on which cells are chosen by the user for the playback.

In some embodiments, the story grid 200, 300 or the story development engine 30 may provide for conditional links that can be defined for two or more cells. A conditional link includes a conditional statement that links the two or more cells. The conditional statement may be used, for example, to maintain a logical structure within the multiple storylines within a grid (e.g., by forcing certain cells to be selected based on the selection of other cells). As sections and rows are created within the grid, conditional statements may be used to link cells within those sections and those rows. The linking may be used to maintain a logical flow within the many possible storylines by linking two or more cells that should be used in sequence. This can be used to develop different alternate storylines wherein each storyline has cells that are allowed in the storyline and others that are not. In other words, any given cell (e.g., cell 230A) may have conditional links to cells that occur on other parts of the timeline such that if that cell 230A is selected, then only a subset of cells in the future or past timeline may be selected. This can be used to eliminate logically impossible storylines wherein the user of the grid defines the logical connections between the cells. For example, the creator of a story may at some point in a story decide that a character enters a pet shop and buys two dogs while in another storyline the character buys only one dog. The cells that occur in columns after the dog purchase can have conditional statements that allow a cell to be selected only if a previous cell is tagged with a certain value such as being compatible with a one (or two) dog storyline.

In some embodiments, grid cells, columns, rows, or sections may have additional metadata attached to them. This metadata can include, for example, scripts associated with particular grid elements to help the user understand the ideas behind the content elements. The metadata can include instructions to the grid player 402 on how to playback the content within the grid.

Figure 8:
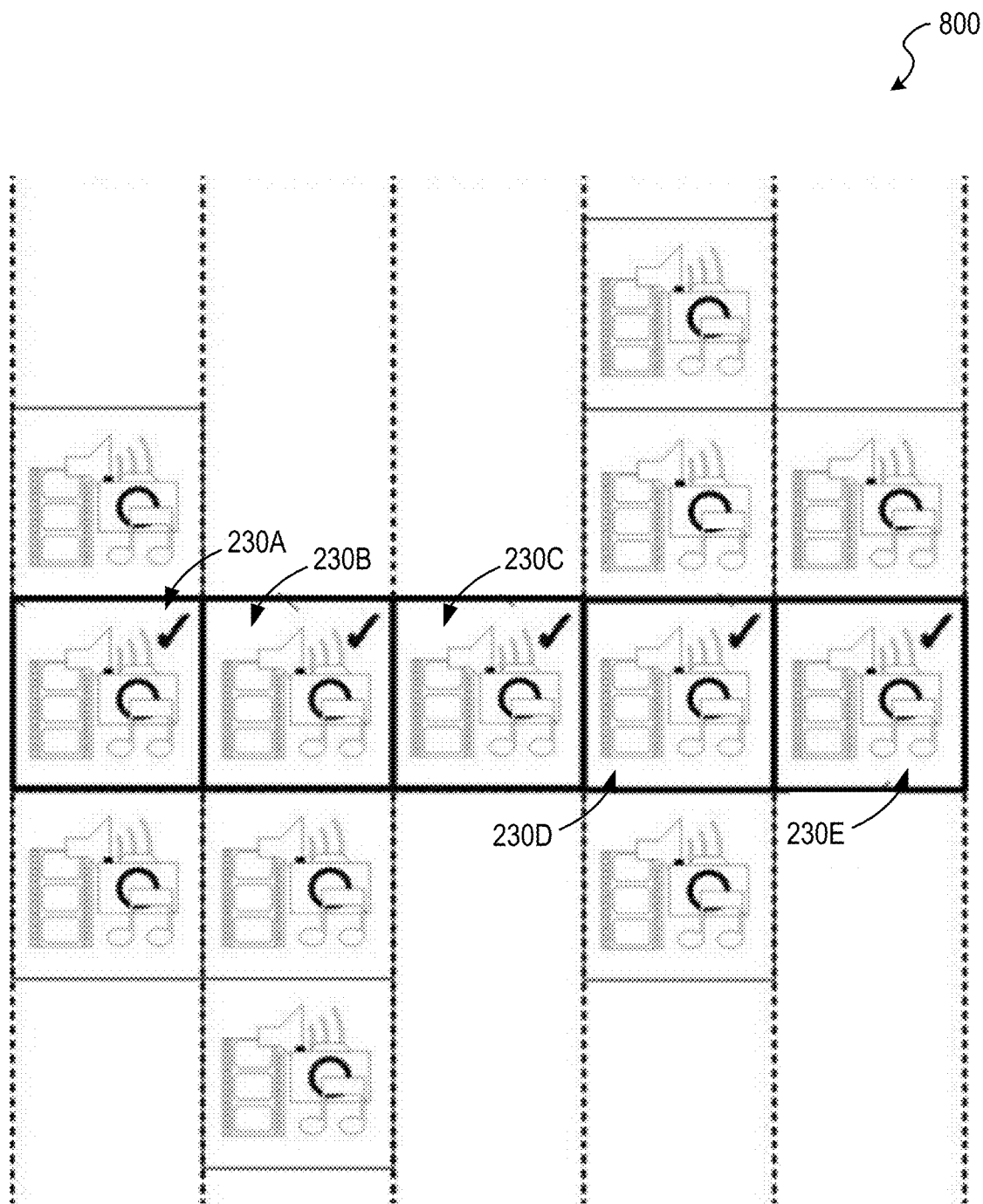
FIG. 8 is a schematic illustrating a user interface with cell selection, in accordance with one embodiment.

FIG. 8 illustrates an example GUI 800 provided by the story development engine 30 for creating and displaying a story grid similar to the story grids 200, 300. In the example embodiment, the GUI 800 includes an area that displays the rows and columns of the story grid 200. Content elements may be added to the columns in the grid via a drag and drop method or any other method known to those skilled in the art. The row (cell) for each column can be chosen by simply selecting the desired cell by double clicking the cell or by selecting the cell with a touch pad device. In the example embodiment, the selected content elements 230 are aligned. This provides for a more simplified visual representation of the selected content elements 230.

Figure 9:
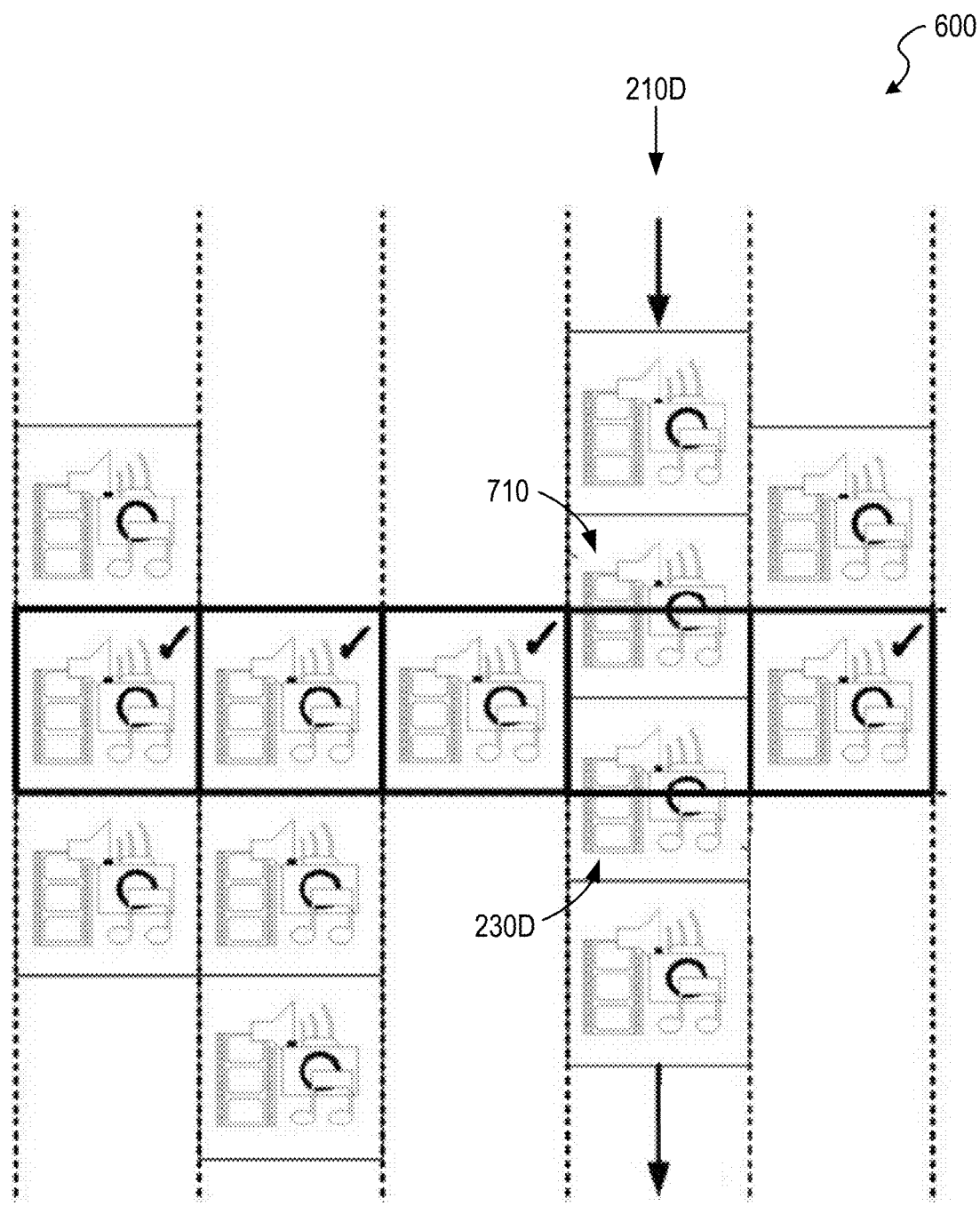
FIG. 9 is a schematic illustrating a 3 dimensional story grid, in accordance with one embodiment.

FIG. 9 illustrates an example selection operation in which the user 12 is shifting the selected content element for column 210D. In the example embodiment, the user 12 may scroll the columns 210 up or down to alter which content element is selected, as indicated by the aligned, highlighted area. As the user 12 pushes the column 210D down, content element 230D becomes unselected and a content element 710 becomes selected. In some embodiments, the user 12 may move the column with a mouse or with a finger of the user 12 (e.g., on a touch pad device).

Figure 10:
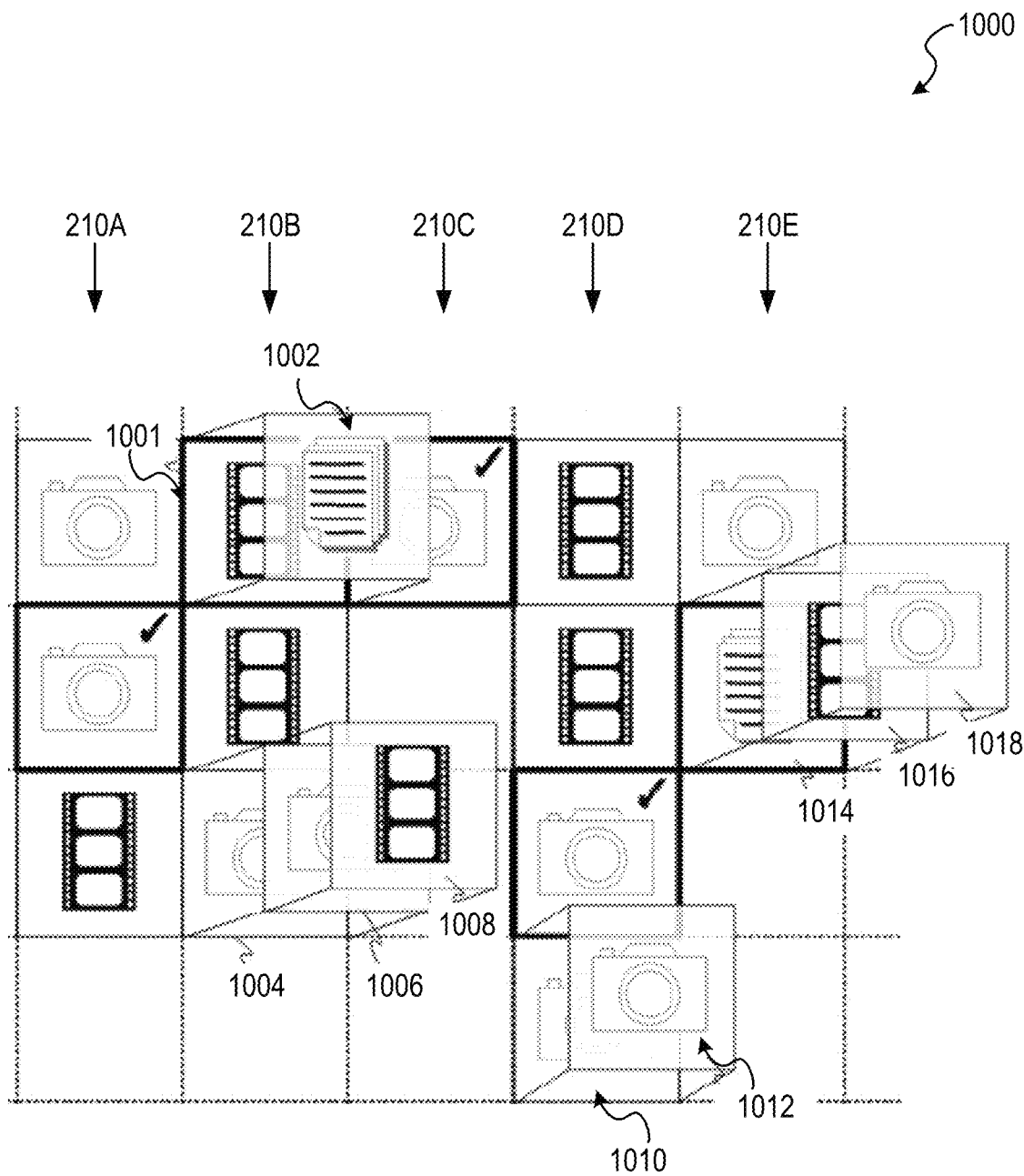
FIGS. 10 and 11 is a schematic illustrating a 3 dimensional story grid, in accordance with one embodiment.
Figure 11:
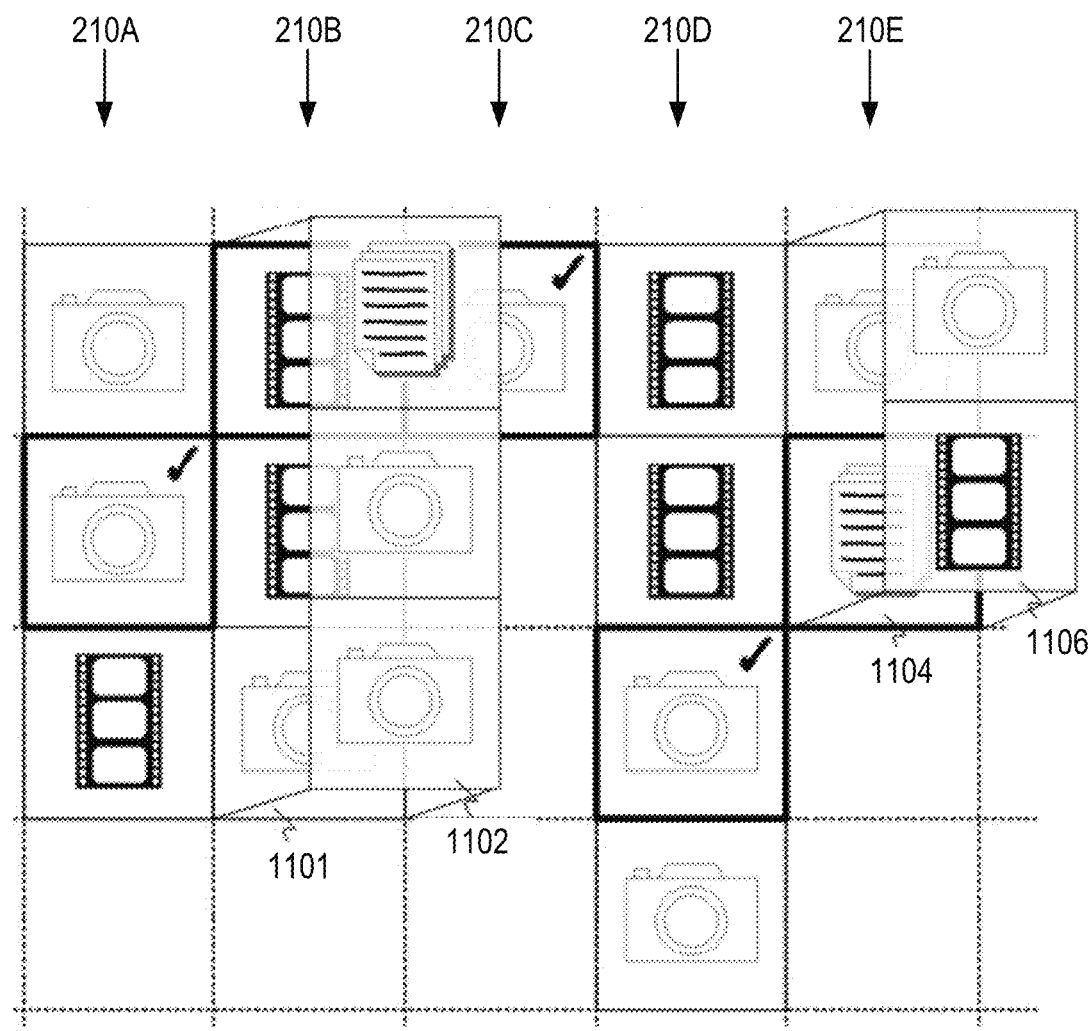

FIGS. 10 and 11 illustrate an example story 3D story grid 1000. In the example embodiment, a single cell may have multiple representations based on various conditions. The 3D story grid 1000 increases the number of possible stories that can be created by adding additional possibilities to each cell. The third dimension of the grid 1000 may be created cell by cell, where any cell on the grid can have any number of additional cells in the third dimension. For example, the cell 1001 in column 210B has an additional possible cell 1002 containing a content element in the third dimension. In some embodiments, content elements within the same cell may be required to have the same media type. In other embodiments, content elements within the same cell may not be required to have the same media type as the original cell 1001. In the example shown in FIG. 10, the original cell 1001 contains a video and the cell in the third dimension 1002 contains text. A cell can have multiple levels in the third dimension. For example, the cell 1004 for column 210B has an image in a second cell 1006 and a video in a third cell 1008.

As shown in FIG. 11, the third dimension may be created on a column by column basis, whereby any column 210 on the said grid can have any number of additional columns in the third dimension. For example, column 210B in FIG. 11 has an original set of rows of content elements 1101 and another set of rows of content elements 1102 in the third dimension. The user 12 creating the story can switch between the two levels of the third dimension. The third dimension can be used for purposes that include adding a completely different alternate version of a scene. For example, the said original set of three rows of media elements 1101 might represent three versions of a fight scene whereas the media elements 1102 in the third dimension represent three versions of a chase scene.

The methods and systems described herein may be used to create a pre-production multimedia tool. As such, the final output story grid can be passed to a secondary software production tool that can further define, structure and complete a project.

The examples provided herein of how to use a story scratchpad system are presented for illustration of this disclosure and some of its benefits. Such examples of use should not be construed to be limitations on the logical process embodiments of the invention, nor should variations of user interface methods from those described herein be considered outside the scope of the present invention.

Figure 12:
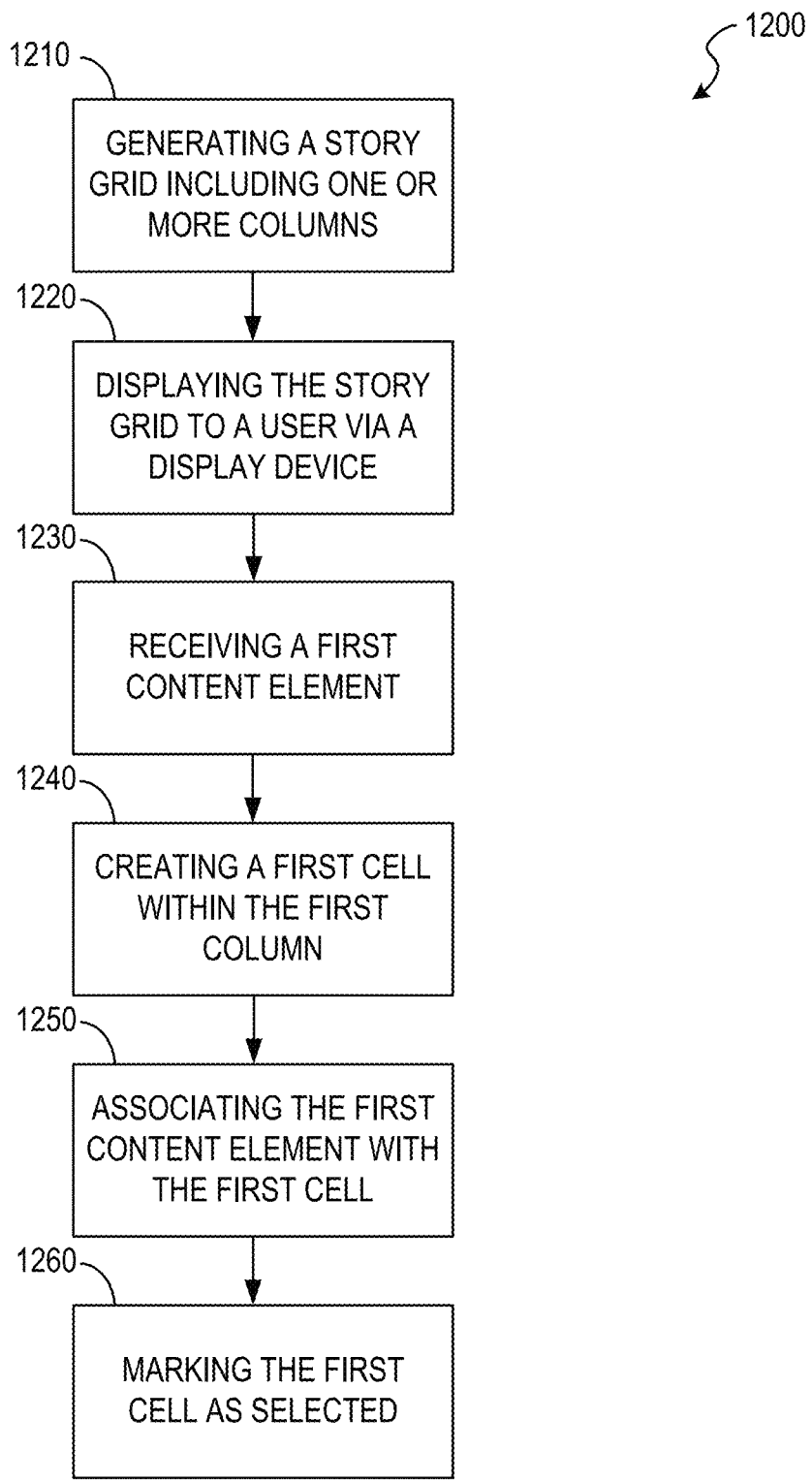
FIG. 12 illustrates an example computer-implemented method for providing the story grid.

FIG. 12 illustrates an example computer-implemented method 1200 for providing the story grid 200. The computer-implemented method 1200, hereafter referred to as "the method 1200," is performed by a computing device comprising at least one hardware processor and a display device. In the example embodiment, the method 1200 includes generating a story grid, the story grid including one or more columns, each column of the one or more columns representing one part in a digital story (see operation 1210). The method 1200 also includes displaying the story grid to a user via a display device (see operation 1220). The method 1200 further includes receiving a first content element (see operation 1230), creating a first cell within a first column (see operation 1240), and associating the first cell with the first content element (see operation 1250). The method also includes marking the first cell as a selected cell from a plurality of cells within the first column, the selected cell being identified for inclusion as the one part of the digital story and excluding the other cells of the plurality of cells from the digital story (see operation 1260).

In some embodiments, each column of the one or more columns includes only one cell within that column marked for inclusion in the digital story. In some embodiments, the one or more columns represent a sequential order from left to right, and the method 1200 further includes presenting the digital story, to the user via the display, using the marked cell from each column of the one or more columns, the marked cells are presented in a temporal order based on the sequential order of the one or more columns. In some embodiments, the method 1200 further includes receiving a second content element, additionally associating the first cell with the second content element, displaying the first content element in on the story grid in the first cell, and displaying the second content element in a perspective view above the first cell on the story grid, visually simulating a third dimension of the story grid.

In some embodiments, the story grid further includes a plurality of sections, each section of the plurality of sections includes one or more columns, and the method further includes providing a visual indicator on the story grid identifying which columns of the plurality of columns belong to a first section. In some embodiments, the method 1200 further includes storing a story grid file associated with the story grid, the story grid file including metadata associated with the structure of the story grid and the first content element, the metadata identifying one or more of a number of columns of the story grid, a number of cells within the first column, and association of the first cell with the first content element. In some embodiments, the method 1200 further includes permissioning a second user for modifying the story grid file, the permissioning identifies a granularity level including one or more of cell-level access to the first cell and column-level access to the first column.

The examples of how to use the story development engine 30 are shown to illustrate the systems and methods described herein, and associated benefits. Such examples of use should not be construed to be limitations on the logical process embodiments, nor should variations of user interface methods from those described herein be considered outside the scope of the present disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly conFIGs. a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Programming Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-12 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the systems and methods described herein in different contexts from this disclosure.

Figure 13:
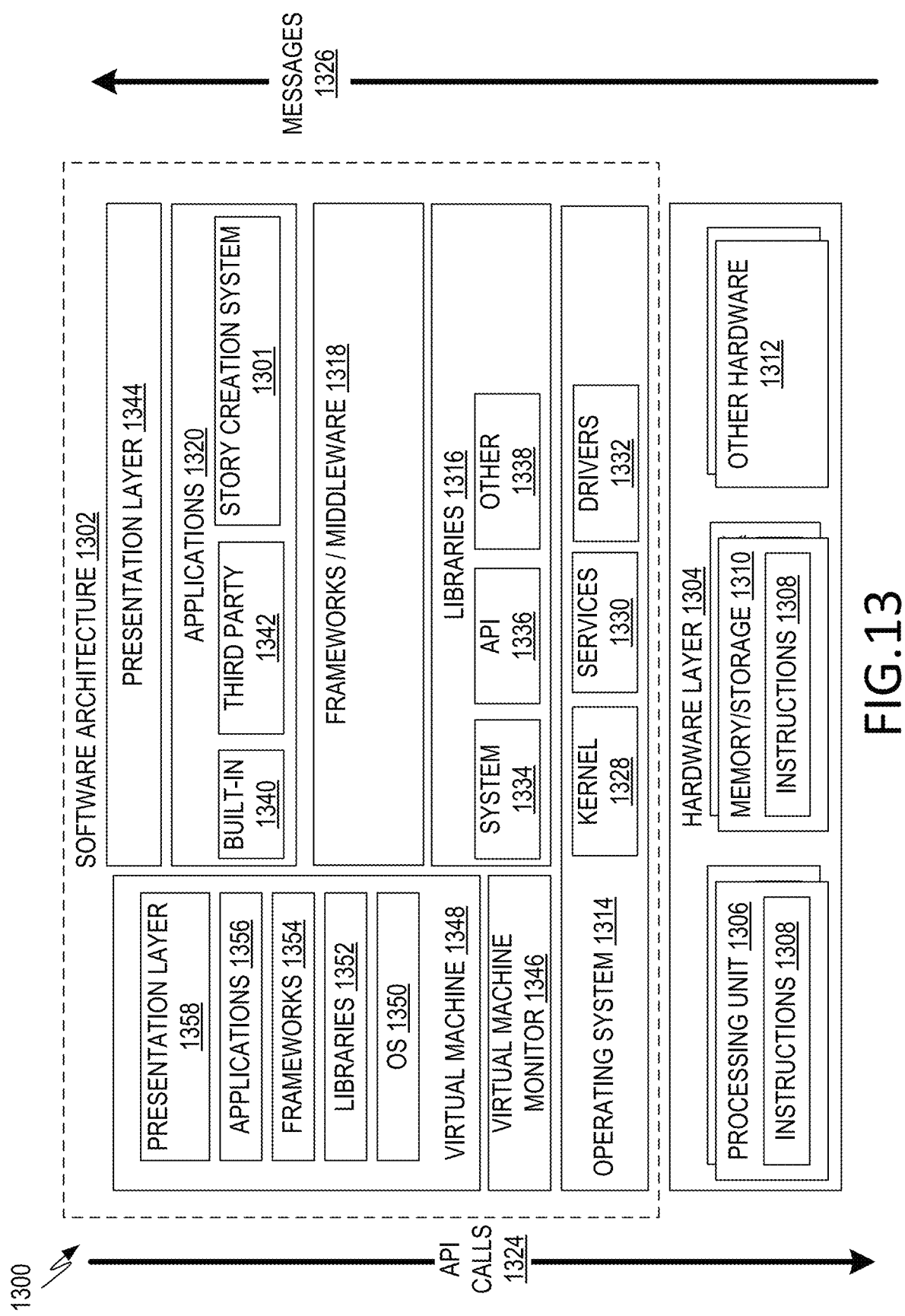
FIG. 13 is a block diagram illustrating an example software architecture, which may be used in conjunction with various hardware architectures herein described to provide a story creation system similar to the story scratchpad as described above.

FIG. 13 is a block diagram 1300 illustrating a representative software architecture 1302, which may be used in conjunction with various hardware architectures described herein to provide the VR tools and development environment described herein. FIG. 13 is merely a non-limiting example of a software architecture, and it will be appreciated that many other architectures may be implemented to facilitate the functionality described herein. The software architecture 1302 may be executing on hardware such as a machine 1400 of FIG. 14 that includes, among other things, processors 1410, memory 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules and so forth of FIGS. 1-12. Hardware layer 1304 also includes memory or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide a frameworks/middleware 1318 layer, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 or other components or layers. The libraries 1316 typically provide functionality that allows other software modules to perform tasks in an easier fashion than to interface directly with the underlying operating system 1314 functionality (e.g., kernel 1328, services 1330 or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 or other software components/modules, some of which may be specific to a particular operating system or platform.

The applications 1320 include built-in applications 1340 or third party applications 1342. Examples of representative built-in applications 1340 may include, but are not limited to, a contacts application, a browser application, a book reader application, a location application, a media application, a messaging application, an onion skin animation tool 1401, or a game application. The third-party applications 1342 may include any of the built-in applications as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system such as the operating system 1314 to facilitate functionality described herein.

The applications 1320 may utilize built in operating system functions (e.g., kernel 1328, services 1330 or drivers 1332), libraries (e.g., system libraries 1334, API libraries 1336, and other libraries 1338), and frameworks/middleware 1318 to create user interfaces to interact with users of the system. Alternatively, or additionally, in some systems interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. A virtual machine creates a software environment where applications/modules can execute as if they were executing on a hardware machine (such as the machine 1500 of FIG. 14, for example). A virtual machine is hosted by a host operating system (operating system 1314 in FIG.

13) and typically, although not always, has a virtual machine monitor 1346, which manages the operation of the virtual machine 1348 as well as the interface with the host operating system (i.e., operating system 1314). A software architecture executes within the virtual machine 1348 such as an operating system 1350, libraries 1352, frameworks/middleware 1354, applications 1356, or presentation layer 1358. These layers of software architecture executing within the virtual machine 1348 can be the same as corresponding layers previously described or may be different.

In the example embodiment, the VR engine 1401 operates as an application in the applications 1320 layer. However, in some embodiments, the VR engine 1401 may operate in other software layers, in multiple software layers (e.g., framework/middleware 1318 and applications 1320), or in any architecture that enables the systems and methods as described herein. The VR engine 1401 may be similar to the VR engine 212.

Figure 14:
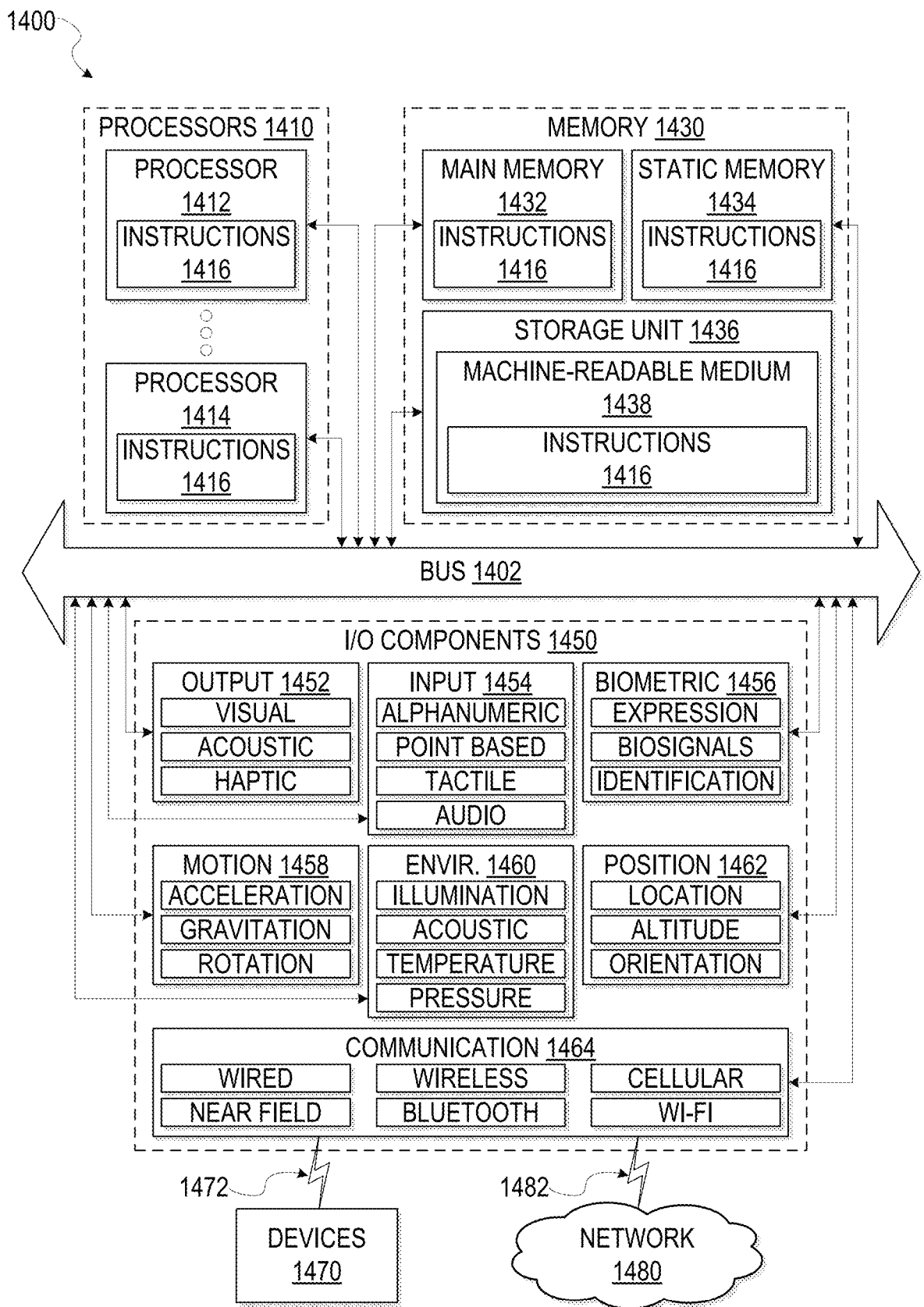
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium 1338 (e.g., a machine-readable storage medium) and perform any one or more of the VR methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example the instructions may cause the machine to execute the flow diagrams of FIGS. 2 or 12. The instructions transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1412 and a processor 1414 that may execute the instructions 1416. The term "processor" is intended to include a multi-core processor that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1236, both accessible to the processors 1410 such as via the bus 1402. The storage unit 1236 and memory 1432 store the instructions 1416 embodying any one or more of the methodologies or functions described herein. The instructions 1416 may also reside, completely or partially, within the memory 1432, within the storage unit 1236, within at least one of the processors 1410 (e.g., within the processor's cache memory), or any suitable combination thereof, during execution thereof by the machine 1400. Accordingly, the memory 1432, the storage unit 1236, and the memory of the processors 1410 are examples of machine-readable media.

As used herein, "machine-readable medium" means a device able to store instructions and data temporarily or permanently and may include, but is not ,limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), position-sensing components, and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472 respectively. For example, the communication components 1464 may include a network interface component or other suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a display device;
   one or more hardware processors; and
   a story development engine executable by the one or more hardware processors, the story development engine configured to perform operations for providing a graphical user interface for a dynamic story grid, the operations comprising:
   generating the dynamic story grid, the dynamic story grid including one or more rearrangeable columns, each column of the one or more rearrangeable columns including one or more cells, each column of the one or more columns representing one part in a digital story, the one or more rearrangeable columns having a horizontal order representing a sequential order of parts of the digital story;
   displaying the dynamic story grid to a user via the display device;
   receiving a first content element of a plurality of content elements;
   associating a first cell of the one or more cells included in a first column of the one or more columns with the first content element;
   based on a receiving of a selection of the first cell included in the first column, marking the first cell included in the first column as a selected cell of the one or more cells included in the first column, the marking of the first cell indicating that the first content element is to be included as the one part of the digital story, the marking of the cell unmarking any other cell of the one or more cells that was previously marked, the other cells being associated with other content elements of the plurality of content elements, the unmarking of any other cell indicating that the other content items are to be excluded from the one part of the digital story; and
   causing generation of a media output from a final story structure of the digital story represented in the dynamic story grid, the final story structure including the first content element as the one part of the digital story based on the marking of the first cell, the media output being assembled by a grid player from the first content element and at least one of the other content elements in the sequential order, the assembling including converting a media format of the first content element into a media format of the media output and converting a media format of the at least one other content element into the media format of the media output.

2. The system of claim 1, wherein the marking is performed by scrolling through the one or more cells within the first column and wherein each column of the one or more columns includes only one cell within that column marked for inclusion in the digital story.

3. The system of claim 2, the operations further comprising:
   presenting the digital story, to the user via the display, using the marked cell from each column of the one or more columns, the marked cells are presented in a temporal order based on the sequential order of the one or more columns.

4. The system of claim 1, the operations further comprising:
   receiving a second content element;
   additionally associating the first cell with the second content element;
   displaying the first content element in in the story grid in the first cell; and
   displaying the second content element in a perspective view above the first cell on the story grid, visually simulating a third dimension of the story grid.

5. The system of claim 1, wherein the story grid further includes a plurality of sections, each section of the plurality of sections includes one or more columns, the operations further comprising:
   providing a visual indicator on the story grid identifying which columns of the plurality of columns belong to a first section.

6. The system of claim 1, wherein the plurality of content elements includes digital content of two or more of the following types: audio, video, text, images, web uniform resource locators, HyperText Markup Language (HTML), Cascading Style Sheets (CSS) and computer code; and wherein an appropriate player is used to display each of the plurality of content elements based on each of the types.

7. The system of claim 1, the operations further comprising:
   permissioning a second user for modifying the story grid or story grid file, the permissioning identifying a granularity level including one or more of cell-level access to the first cell, column-level access to the first column, and section level access.

8. A computer-implemented method comprising:
   generating a graphical user interface having a dynamic a story grid, the dynamic story grid including one or more rearrangeable columns, each column of the one or more rearrangeable columns including one or more cells, each column of the one or more columns representing one part in a digital story, the one or more rearrangeable columns having a horizontal order representing a sequential order of parts of the digital story;
displaying the dynamic story grid to a user via a display device;
receiving a first content element of a plurality of content elements;
associating a first cell of the one or more cells included in a first column of the one or more columns with the first content element;
based on a receiving of a selection of the first cell included in the first column, marking the first cell included in the first column as a selected cell of the one or more cells included in the first column, the marking of the first cell indicating that the first content element is to be included as the one part of the digital story, the marking of the cell unmarking any other cell of the one or more cells that was previously marked, the other cells being associated with other content elements of the plurality of content elements, the unmarking of any other cell indicating that the other content items are to be excluded from the one part of the digital story; and
causing generation of a media output from a final story structure of the digital story represented in the dynamic story grid, the final story structure including the first content element as the one part of the digital story based on the marking of the first cell, the media output being assembled by a grid player from the first content element and at least one of the other content elements in the sequential order, the assembling including converting a media format of the first content element into a media format of the media output and converting a media format of the at least one other content element into the media format of the media output.

9. The method of claim 8, wherein the marking is performed by scrolling through the one or more cells within the first column and wherein each column of the one or more columns includes only one cell within that column marked for inclusion in the digital story.

10. The method of claim 9, the operations further comprising:
presenting the digital story, to the user via the display, using the marked cell from each column of the one or more columns, the marked cells are presented in a temporal order based on the sequential order of the one or more columns.

11. The method of claim 8, the method further comprising:
receiving a second content element;
additionally associating the first cell with the second content element;
displaying the first content element in in the story grid in the first cell; and
displaying the second content element in a perspective view above the first cell on the story grid, visually simulating a third dimension of the story grid.

12. The method of claim 8, wherein the story grid further includes a plurality of sections, each section of the plurality of sections includes one or more columns, the method further comprising:
providing a visual indicator on the story grid identifying which columns of the plurality of columns belong to a first section.

13. The method of claim 8, wherein the plurality of content elements includes digital content of two or more of the following types: audio, video, text, images, web uniform resource locators, HyperText Markup Language (HTML), Cascading Style Sheets (CSS) and computer code; and wherein an appropriate player is used to display each of the plurality of content elements based on each of the types.

14. The method of claim 8, the method further comprising:
permissioning a second user for modifying the story grid or story grid file, the permissioning identifying a granularity level including one or more of cell-level access to the first cell, column-level access to the first column, and section level access.

15. A non-transitory machine-readable medium storing processor-executable instructions which, when executed by a processor, cause the processor to perform operations for providing a graphical user interface for a dynamic story grid, the operations:
generating the dynamic story grid, the dynamic story grid including one or more rearrangeable columns, each column of the one or more rearrangeable columns including one or more cells, each column of the one or more columns representing one part in a digital story, the one or more rearrangeable columns having a horizontal order representing a sequential order of parts of the digital story;
displaying the dynamic story grid to a user via a display device;
receiving a first content element of a plurality of content elements;
associating a first cell of the one or more cells included in a first column of the one or more columns with the first content element;
based on a receiving of a selection of the first cell included n the first column, marking the first cell included in the first column as a selected cell of the one or more cells included in the first column, the marking of the first cell indicating that the first content element is to be included as the one part of the digital story excluding, the marking of the cell unmarking any other cell of the one or more cells that was previously marked, the other cells being associated with other content elements of the plurality of content elements, the unmarking of any other cell indicating that the other content items are to be excluded from the one part of the digital story; and
causing generation of a media output from a final story structure of the digital story represented in the dynamic story grid, the final story structure including the first content element as the one part of the digital story based on the marking of the first cell, the media output being assembled by a grid player from the first content element and at least one of the other content elements in the sequential order, the assembling including converting a media format of the first content element into a media format of the media output and converting a media format of the at least one other content element into the media format of the media output.

16. The machine-readable medium of claim 15, wherein the marking is performed by scrolling through the one or more cells within the first column and wherein each column of the one or more columns includes only one cell within that column marked for inclusion in the digital story.

17. The machine-readable medium of claim 15, wherein the operations further cause the processor to:
receive a second content element;
additionally associate the first cell with the second content element;
displaying the first content element in in the story grid in the first cell; and display the second content element in a perspective view above the first cell on the story grid, visually simulating a third dimension of the story grid.

18. The machine-readable medium of claim 15, wherein the story grid further includes a plurality of sections, each section of the plurality of sections includes one or more columns, wherein the operations further cause the processor to:
provide a visual indicator on the story grid identifying which columns of the plurality of columns belong to a first section.

19. The machine-readable medium of claim 15, wherein the plurality of content elements includes digital content of two or more of the following types: audio, video, text, images, web uniform resource locators, HyperText Markup Language (HTML), Cascading Style Sheets (CSS) and computer code; and wherein an appropriate player is used to display the plurality of content elements based on each of the types.

20. The machine-readable medium of claim 15, the operations further comprising:
permissioning a second user for modifying the story grid file, the permissioning identifying a granularity level including one or more of cell-level access to the first cell, column-level access to the first column, and section level access.

* * * * *

UNITED STATES PATENT AND TRADEMARK OFFICE
CERTIFICATE OF CORRECTION

PATENT NO. : 10,579,220 B2
APPLICATION NO. : 15/336445
DATED : March 3, 2020
INVENTOR(S) : Sylvio Herve Drouin It is certified that error appears in the above-identified patent and that said Letters Patent is hereby corrected as shown below:

In the Claims

In Column 22, Line 35, in Claim 4, delete "in in" and insert --in-- therefor

In Column 23, Line 51, in Claim 11, delete "in in" and insert --in-- therefor

In Column 24, Line 33, in Claim 15, delete "n" and insert --in-- therefor

In Column 24, Line 37, in Claim 15, delete "story excluding," and insert --story,-- therefor In Column 24, Line 56, in Claim 16, before "machine-readable", insert --non-transitory--

In Column 24, Line 61, in Claim 17, before "machine-readable", insert --non-transitory--

In Column 24, Line 66, in Claim 17, delete "in in" and insert --in-- therefor

In Column 25, Line 4, in Claim 18, before "machine-readable", insert --non-transitory--

In Column 25, Line 12, in Claim 19, before "machine-readable", insert --non-transitory--

In Column 25, Line 20, in Claim 20, before "machine-readable", insert --non-transitory--

Signed and Sealed this
Seventeenth Day of November, 2020

Andrei Iancu
*Director of the United States Patent and Trademark Office*